United States Patent [19]
Dufty et al.

[11] Patent Number: 5,509,487
[45] Date of Patent: Apr. 23, 1996

[54] CORING APPARATUS

[76] Inventors: Raymond J. Dufty, 466 Brisbane Road, Arundel, Gold Coast, Queensland, 4214, Australia; Ronald S. Kaye, 5 Bunbird Avenue, Paradise Point, Gold Coast, Queensland, 4216, Australia

[21] Appl. No.: 313,155
[22] PCT Filed: Apr. 1, 1993
[86] PCT No.: PCT/AU93/00139
  § 371 Date: Oct. 3, 1994
  § 102(e) Date: Oct. 3, 1994
[87] PCT Pub. No.: WO93/19580
  PCT Pub. Date: Oct. 14, 1993

[30] Foreign Application Priority Data

Apr. 1, 1992 [AU] Australia .................. PL1638

[51] Int. Cl.⁶ .................................................. A01B 45/02
[52] U.S. Cl. .................................................. 172/21
[58] Field of Search .................. 172/21, 22; 56/16.7

[56] References Cited

U.S. PATENT DOCUMENTS

| | | | |
|---|---|---|---|
| 2,730,028 | 1/1956 | Oswalt | 172/21 |
| 2,918,130 | 12/1959 | Thom | 172/22 |
| 3,015,364 | 1/1962 | Fitzgerald | 172/22 |
| 4,476,938 | 10/1984 | McKay | 172/22 |
| 4,753,298 | 6/1988 | Hansen et al. | 172/22 |

FOREIGN PATENT DOCUMENTS

| | | |
|---|---|---|
| 101106 | 6/1937 | Australia . |
| 37385/50 | 10/1950 | Australia . |
| 151346 | 5/1953 | Australia . |
| 225403 | 11/1959 | Australia . |
| 226782 | 1/1960 | Australia . |
| 834078 | 5/1960 | United Kingdom ............ 56/16.7 |
| 2225692 | 6/1990 | United Kingdom . |

OTHER PUBLICATIONS

"Mutt and Jeff" Comic Strip By Bud Fisher, Washington Evening Star, Aug. 24, 1952.

Primary Examiner—Dave W. Arola
Assistant Examiner—Christopher J. Novosad
Attorney, Agent, or Firm—Jacobson, Price, Holman & Stern

[57] ABSTRACT

A coring apparatus for forming a plurality of vertical cores or bores in the ground surface which includes a mobile wheeled frame supporting a plurality of rotatably driven, vertically moveable drilling members which are moved between a lowered operative position and an elevated inoperative position in which the drilling members are oriented above the ground surface. The drilling members are mounted on a movable frame component that is pivotally supported from the wheel frame at one end thereof with the opposite end of the moveable frame component supporting the drilling members and connected with crank members powered from a drive motor to raise and lower the moveable frame component and the drilling members. The movable frame component is connected to the mobile frame for longitudinal movement and is provided with a supporting foot that advances the coring apparatus as the drilling members are elevated to an inoperative position and then lowered to an operative position with the eccentricity of the crank means moving the mobile chassis forwardly as the drilling members are moved between operative and inoperative positions.

14 Claims, 6 Drawing Sheets

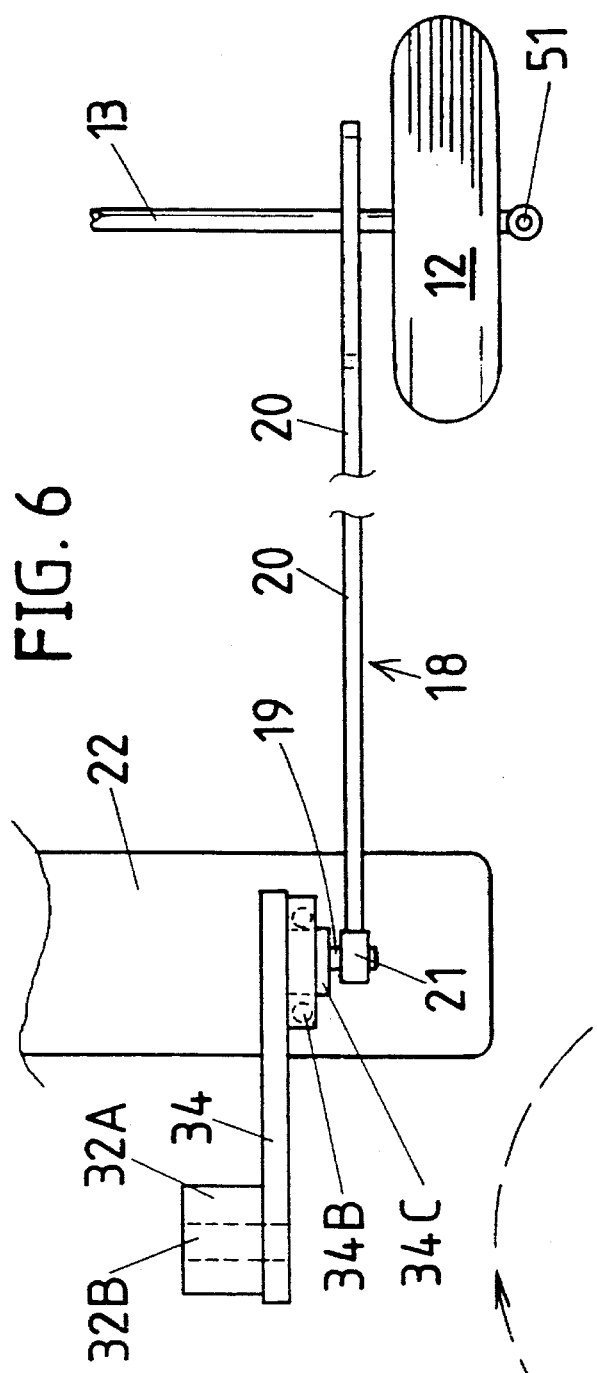
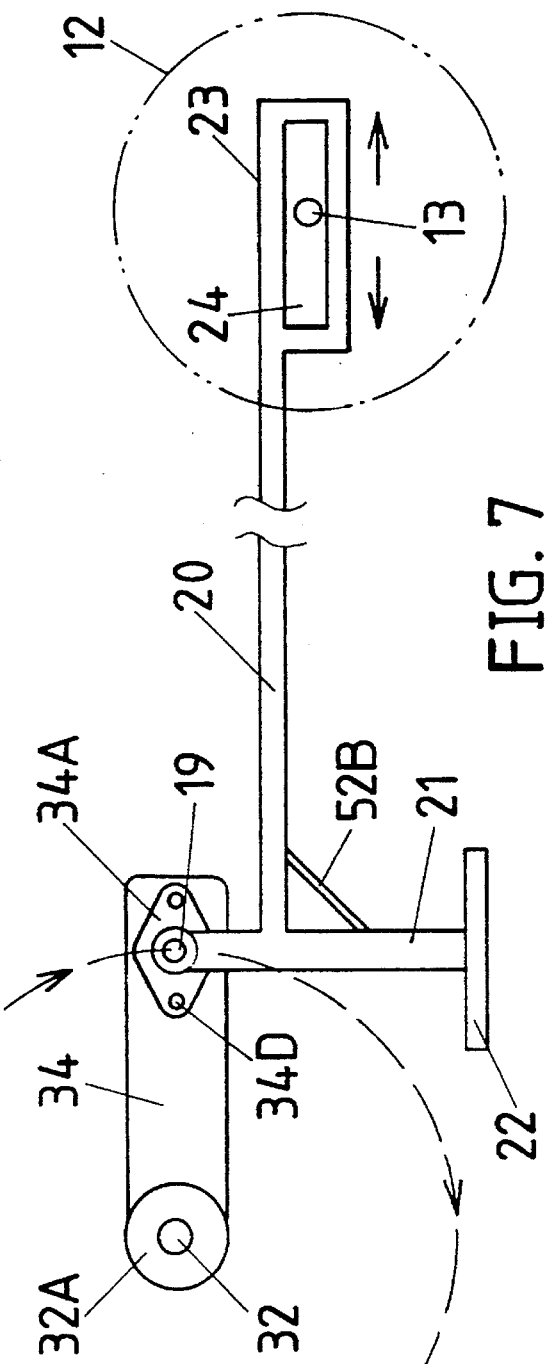

CORING APPARATUS

FIELD OF INVENTION

This invention relates to coring apparatus for treatment of soil and has particular relevance for treatment of soil in which turf or special grasses are cultivated whereby good surface conditions of aeration and drainage are required. This applies particularly to conditioning of grass or lawn used in bowling greens, tennis courts, golf courses inclusive of fairways and more particularly greens and applications of a similar nature.

In this regard it has to be borne in mind that the surface of cultivated grass or turf areas such as golf greens and bowling greens are subjected to excessive traffic by both people and machines for mowing, rolling and coring and the like and compaction of the top layer of the turf results from such activity as well as formation of a scum or thatch from the deposit of fine material from various sources. This condition has to be treated by coring or drilling through the top layer.

BACKGROUND ART

Conventional coring apparatus or machines comprise a manually operated machine having a plurality of cores which undergo vertical reciprocatory non rotary motion which are operated from a belt drive from a motor mounted on the machine. However, this conventional coring machine was disadvantageous in that it had to be manually moved over the surface of the turf and also by using static or non rotating cores such cores exerted a dragging effect or lateral movement on the turf which had a tendency to tear or rip at the turf.

BROAD STATEMENT OF INVENTION

It therefore is an object of the invention to provide coring apparatus which may reduce the disadvantages applicable to the prior art referred to above.

The coring apparatus includes
(i) a coring support having a plurality of vertically aligned drilling members for coring a ground surface;
(ii) means for causing rotational movement of the drilling members during vertically reciprocatory movement thereof from an operative position when the ground surface is penetrated by the drilling members to an inoperative position when the drilling members are clear of the ground surface;
(iii) a mobile chassis frame having an axle connecting a pair of ground engaging wheels with a movable frame component being pivotally attached to said mobile chassis frame adjacent one end thereof and being slidably attached to said axle adjacent another end thereof whereby said movable frame component is caused to move in a reciprocatable fashion in a substantially horizontal plane relative to said mobile chassis frame; and
(iv) foot means supported by the movable frame component, said foot means being spaced from the drilling members and which foot means contacts the ground surface when the drilling members are in the operative position.

The chassis frame may be of any suitable construction. More suitably the chassis frame is pivotally movable relative to the ground engaging wheels. Suitably the chassis frame includes one or more longitudinal frame members which may be interconnected by one or more cross members or transverse frame members.

The coring support suitably is rigidly attached or integral with the chassis frame and may comprise a coring support plate or head which may support one or more spaced rows of drill members.

The means for causing the rotating movement of the drill members may comprise a plurality of sprockets or pulleys mounted on the coring head which are all rotated by a suitable drive means supported on the chassis frame. There also may be provided a plurality of idlers wherein the sprockets and idlers are all interconnected by an endless drive chain or belt.

The drive means may comprise a drive motor and a belt drive for driving the sprockets or pulleys mounted on the coring head. Suitably the drive motor is coupled by clutch means to the belt drive for uncoupling of the drive motor and the belt drive when required. The belt drive may include one or more pulleys supported on the chassis frame.

Preferably the foot means may advance the chassis frame along the ground when the drilling members are in the inoperative position so that the chassis frame in one embodiment of the invention may be self propelled as described hereinafter.

The foot means in this particular embodiment may move from an initial ground contact position to a second ground contact position in a walking action. When the foot means is in the initial ground contact position the drilling members may be in the operative position and subsequently move to the inoperative position when the foot means has moved to the second ground contact position. The coring apparatus may then advance carrying the drilling members to the next drilling location.

If desired there may be separate drive means for controlling movement of the foot means as well as controlling rotational movement of the drilling members. Preferably however the movement of the foot means is coupled to the drive means for the drilling members.

The movable frame component may be attached to the chassis frame by a crank means suitably at a first location so that the movable frame component may move the foot means from the initial ground contact position to the second ground contact position. In this embodiment the movable frame component may also be attached to the wheel axle at another location spaced from the crank means so that the movable frame component may undergo longitudinal movement relative to the wheel axle.

There also may be provided centering means for causing the coring apparatus to be self propelled or move in circles of decreasing or increasing radii about the centering means which may be located in a centre of a golfing green for example enabling the coring apparatus of the invention to be unattended during operation. The centering means in one embodiment may comprise a drum or hub member to which a cable is wound about which cable is also attached to the wheel axle of the chassis frame.

There also may be provided height adjustment means for adjusting the drilling depth of the drilling members and thus adjusting the drop height of the coring head. This may be achieved for example by attachment cable or line interconnecting the coring head to a fixed canopy which may overlie the coring head. However, if desired alternative height adjustment means may be used.

According to another preferred feature, the rear wheels may be adjustable and can be spaced apart at a distance which is less than the width of transverse dimension of the coring head so that it is possible to drill near edges or corners, or the ground support wheels can be moved closer together so as not to effect the drilling members entering into the ground perpendicularly if operated on undulating surfaces.

Another operational feature which may be utilised is that the crank lift may be constant or variable as may be required. The distance moved by the machine in its forward movement may also be constant or variable as may be required. It is also possible to utilise a single crank member if desired to obtain a greater depth of throw although it is preferred to utilise a pair of cranks on either side of the chassis frame.

BRIEF DESCRIPTION OF THE DRAWINGS

Reference may now be made to a preferred embodiment of the invention as shown in the attached drawings wherein

FIG. 6 is a side view of the coring apparatus showing the movement thereof of the crank member and also of the movable frame component relative to the wheel axle; and FIG. 7 is a plan view of the apparatus shown in FIG. 6.

BEST METHOD FOR CARRYING OUT THE INVENTION

Figure 1:
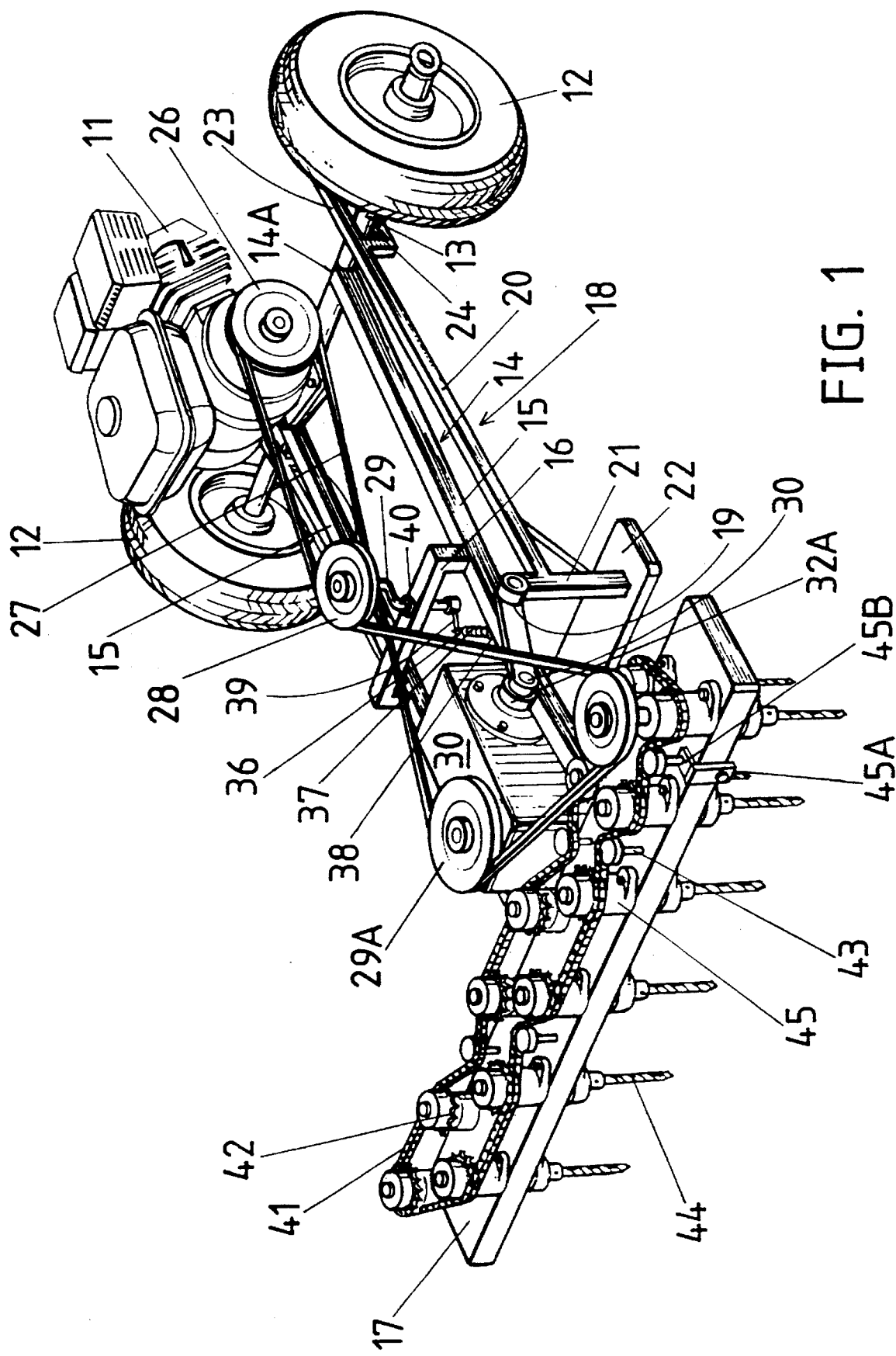
FIG. 1 is a perspective view of a coring apparatus in accordance with the invention.

In respect of coring apparatus 10 shown in FIG. 1, there is provided motor 11, ground support wheels 12, axle 13 connecting wheels 12, chassis frame 14 supported by wheels 12, which includes opposed longitudinal members 15, cross frame 16, and end support member 17 attached to longitudinal members 15. Chassis frame 14 is rigidly attached to axle 13 at 14A.

There is also provided movable frame component 18 which includes opposed longitudinal members 20, vertical members 21 which are associated with a longitudinal frame member 15 so that frame component 18 is movable longitudinally and vertically pivotally with respect to chassis frame 14 and axle 13 as described hereinafter and foot member 22 attached to the pair of vertical members 21. There is also provided a slide joint in the form of a rectangular loop 23 having an aperture 24 through which extends axle 13.

The motor 11 is also supported on chassis frame 14 and includes an output pulley 26 which may also be in the form of a centrifugal clutch which may isolate the motor 11 from being coupled to endless V belt 27 which engages with pulley 28 mounted by angled mounting rod 29 to cross member 16, pulley 29A supported on reduction gear box 30, and pulley 31 mounted on one end of end support member 17. The gear box 30 is in the form of a right angle gearbox which includes a worm (not shown) and associated gear (not shown) and thus couples the movement of pulley 29A to output shaft 32 to which is associated with crank member 34 and best illustrated in FIG. 2, FIG. 3, FIG. 6 or FIG. 7. Crank member 34 is pivotally attached to vertical members 21 of movable frame component 18 by pivot joint 19.

There is also shown a belt tensioner 36 wherein spring 37 is attached to frame member 15 at 38 and tensioner rod 39 is connected to angled mounting rod 29 which is pivotally attached to cross frame 16 at 40 to bias pulley 28 to maintain belt 27 taut.

The end support member 17 includes an endless chain 41 which engages a plurality of sprockets 42 mounted to end support member 17. There is also provided a plurality of idler rollers 43 mounted to end support member 17 which also engage with endless chain 41 as shown. Attached to each sprocket 42 is an associated drill 44 which may rotate in unison with sprockets 42. Bearing plates 45 attach each drill 44 to end support member 17. One idler roller 43 is attached to end support member by bracket 45A and an angled rod 45B to thereby constitute a chain tensioner.

Figure 2:
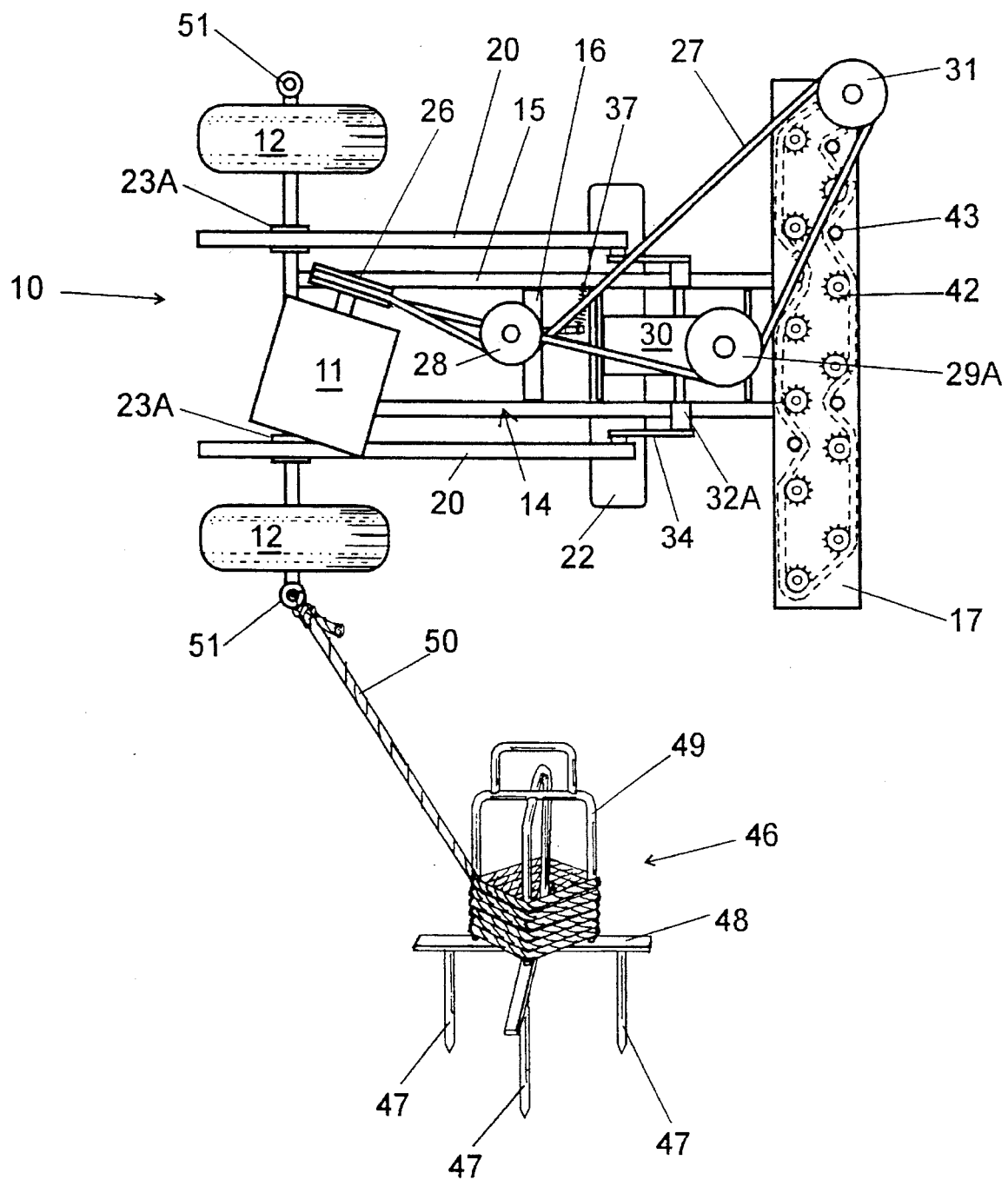
FIG. 2 is a plan view of the coring apparatus shown in FIG. 1 together with an associated centering device.
Figure 5:
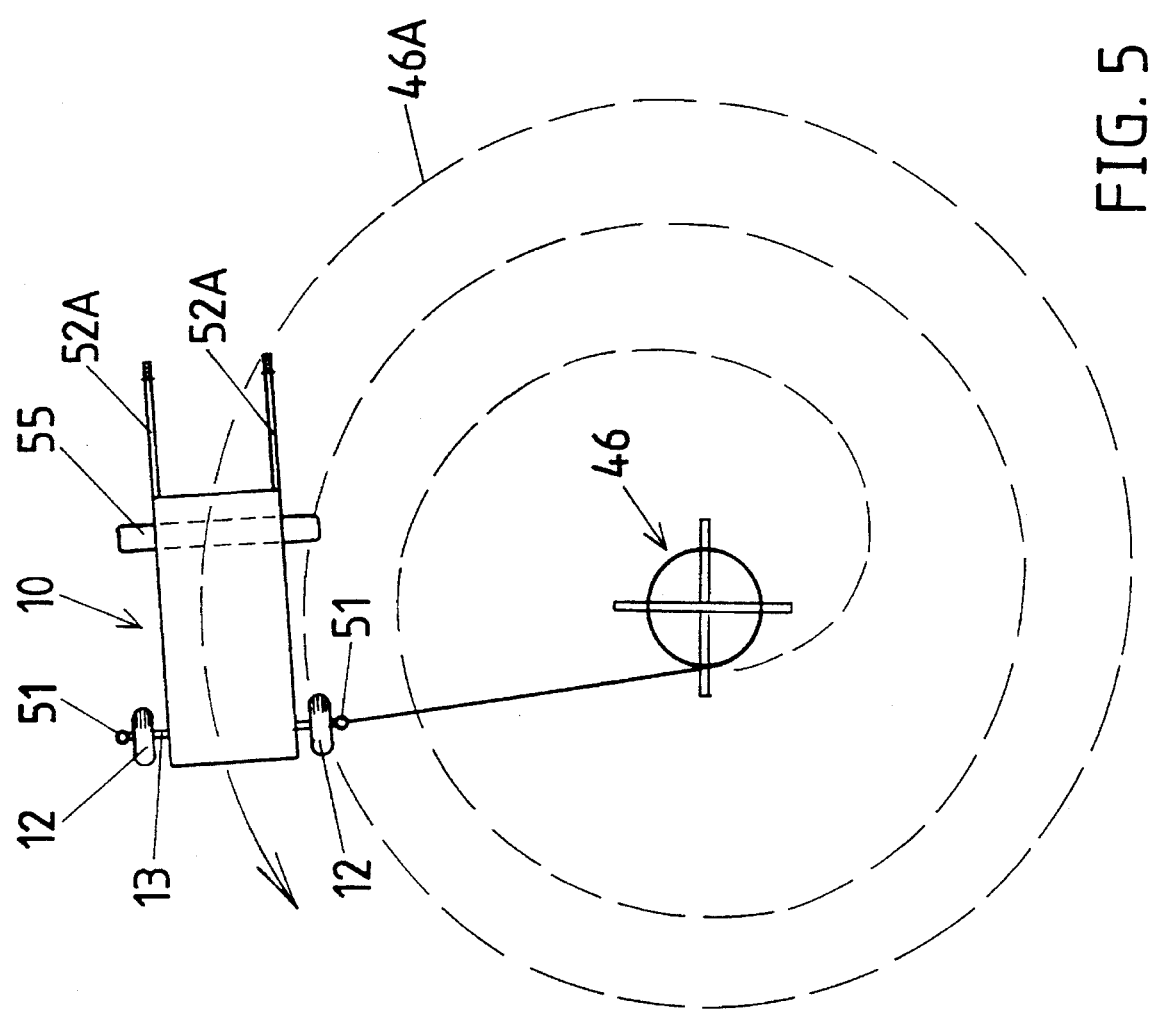
FIG. 5 is a plan view of the coring apparatus of FIG. 1 in operation on a golfing green in conjunction with the centering device.

In FIG. 2 there is also illustrated a centering member 46 having a plurality of spikes 47 for mounting in the ground as shown in FIG. 5 whereby spikes 47 are all attached to frame 48. Attached to frame 48 is hub member or cable drum 49 to which is attached cable 50 which is attached at 51 to an associated support wheel 12. There is also shown guides 23A for controlling movement of loops 23.

Figure 3:
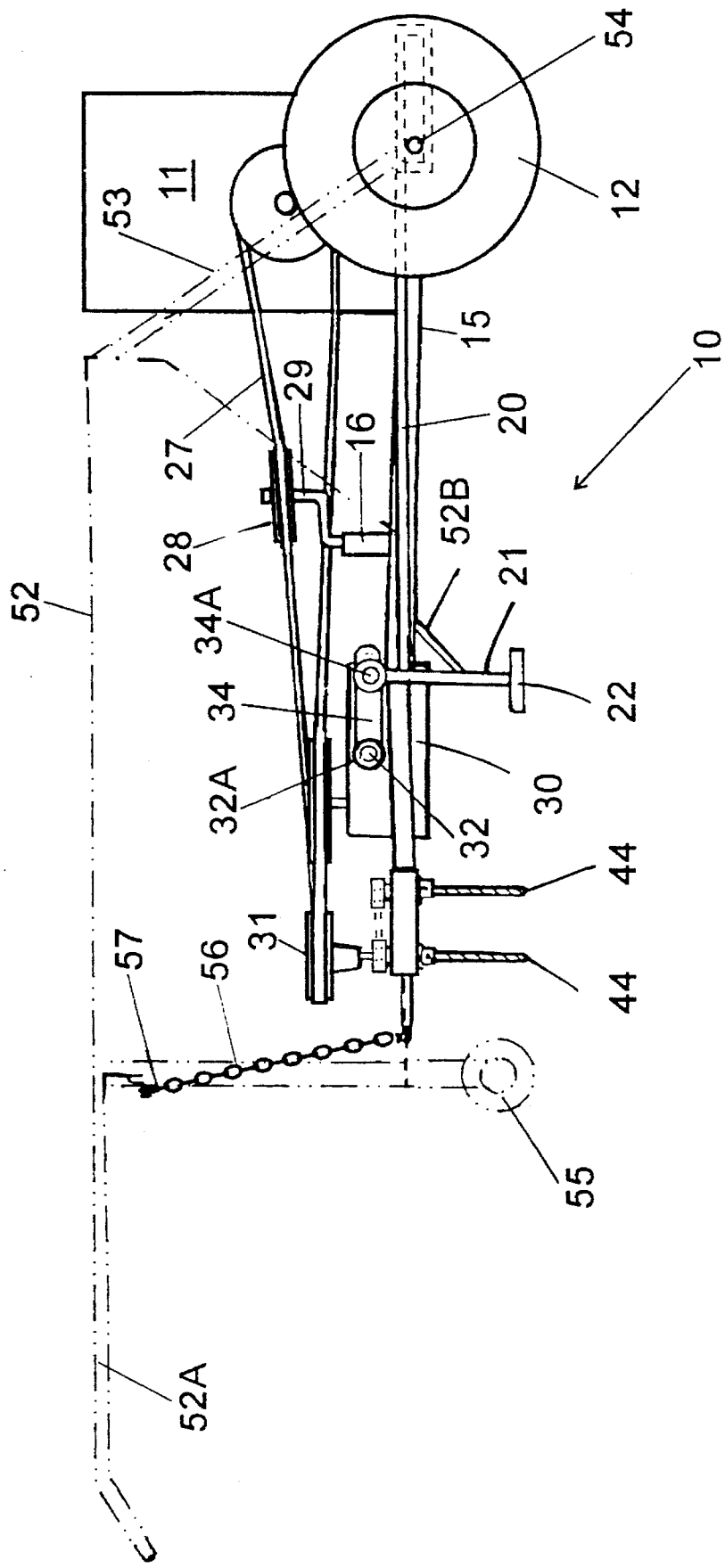
FIG. 3 is a side view of the coring device of FIG. 1 together with an associated canopy member.

In FIG. 3 there is also shown canopy 52 shown in phantom which may be used to cover coring apparatus 10. The canopy includes a pair of support rods 53 pivotally attached to axle 13 at 54. The canopy 52 and associated handle 52A may also be provided with ground engagement roller 55. There is also shown control chain 56 which may be adjustably attached to support member 57 so as to regulate the depth of penetration of drills 44. Brace 52B between vertical member 21 and longitudinal member 20 is also illustrated.

The operation of the coring apparatus of the invention will now be shown in relation to FIGS. 4A, 4B, 4C, 4D, 4E, 5, 6 and 7.

Figure 4A:
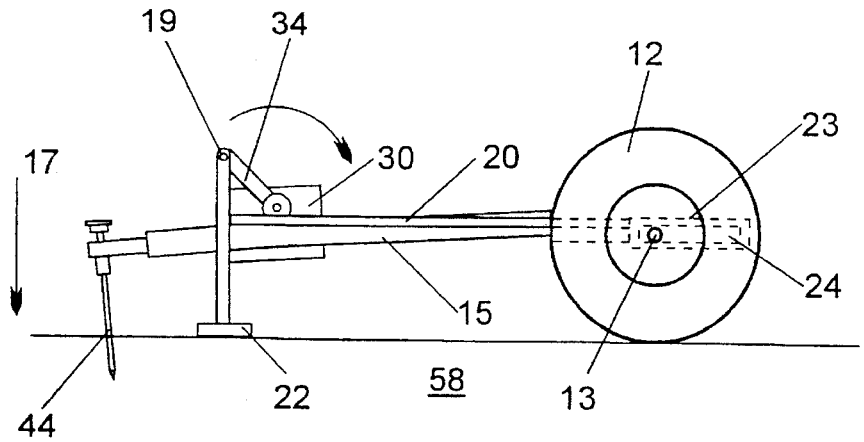
FIGS. 4A, 4B, 4C, 4D and 4E are successive stages in the operation of the coring apparatus shown in FIG. 1.
Figures 4B, 4C:
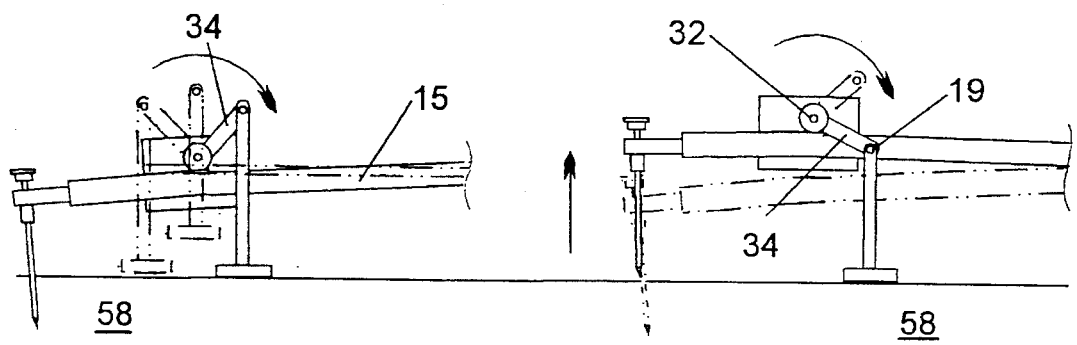
Figure 4D:
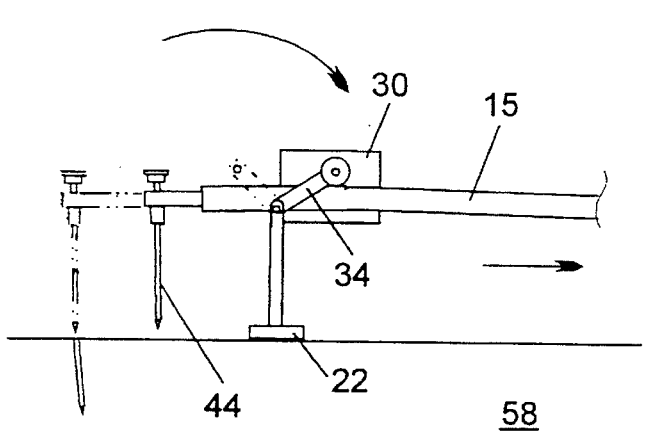

In FIGS. 4A, 4B, 4C, 4D and 4E the sequence of operation in relation to drilling of ground 58 is shown. As the foot 22 contacts the ground the drills 44 may penetrate the ground 58 to a depth controlled by adjustable chain 56. Due to the continued operation of motor 11 and endless belt 27 and consequential rotation of crank 34 about pivot 32, the foot 22 may be moved from the initial ground contact position shown in FIG. 4A to a second ground contact position shown in FIG. 4B. This movement occurs while chassis frame 14 is pivoted downwardly and hence drills 44 are embedded in ground 58. Subsequently as shown in FIG. 4C continued rotation of crank 34 about pivot 32 elevates chassis 14 relative to ground 58 and thus drills 44 are withdrawn from ground 58 to an inoperative position as shown in FIG. 4C and FIG. 4D. Again due to continued rotation of crank 34 the coring apparatus or machine 10 subsequently advances from the position shown in FIGS. 4A, 4B and 4C and shown in phantom in FIG. 4D to the subsequent position shown in full outline in FIG. 4D.

Figure 4E:
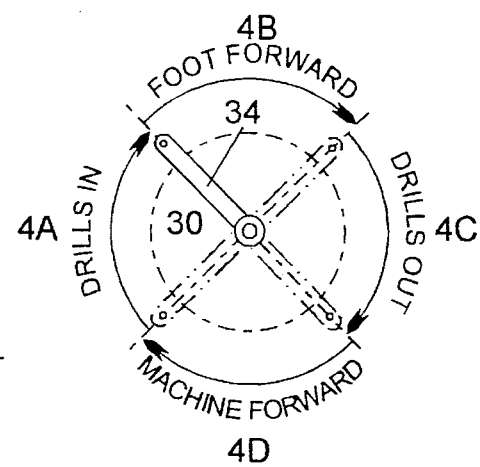

This sequence of events is shown in FIG. 4E showing that as crank 34 rotates through quadrant 4A of its rotational circle about pivot or rotational axis 32, the drills 44 penetrate ground 58 in a coring action. Subsequently as crank 34 rotates through quadrant 4B the foot 22 advances from the position shown in FIG. 4A to the position shown in FIG. 4B. As the crank then rotates through quadrant 4C the drills 44 are removed from ground 58 and as the crank 34 rotates through quadrant 4D the coring apparatus or machine 10 advances from the position shown in FIG. 4C to the position shown in FIG. 4D. Chassis frame 14 may pivot between the positions shown in FIG. 4C by rotational movement of axle 13 although in another variation it will be appreciated that axle 13 may be a fixed shaft 13 supported to wheels 12 by stub axles (not shown) and chassis frame 14 supported by pivot joints (not shown) to the fixed shaft 13.

In FIG. 5 the centering member 46 is mounted on a golf green for example (not shown) and the motor 11 started. The coring apparatus may then travel around the centering member 46 in a series of circles 46A of increasing radii as shown. This will illustrate that the coring apparatus of the invention need not be manually operated and is capable of automated operation.

In FIGS. 6–7 a more detailed view of movable frame component 18 is shown. Each longitudinal member 20 is rigidly attached to upright 21 of foot 22 and frame 18 may move relative to axle 13 when the foot 22 advances from one position to a second position as discussed previously. There is also shown pivot rod 19, bearing housing 34A which is bolted to crank 34 at 34D, outer race 34B and inner bearing member 34C. Sleeve 32A having inner bore 32B is attached to the free end of crank 34 as shown. Crank 34 rotates through the circle shown in phantom as described above in FIG. 4E and loop 23 advances frame 18 longitudinally as shown by the arrows in full outline in FIG. 7 when advancing foot 22.

It therefore will be appreciated from the foregoing that the coring apparatus of the invention by providing a rotary motion to each of the coring or drilling members will ensure that there is no lateral force exerted on turf or grass and that each coring hole in the turf may be formed in an efficient manner without causing any damage to surrounding turf.

We claim:

1. Coring apparatus including
   a coring support having a plurality of vertically aligned drilling members for coring a ground surface;
   means for causing rotational movement of the drilling members during vertically reciprocatory movement thereof from an operative position when the ground surface is penetrated by the drilling members to an inoperative position when the drilling members are clear of the ground surface;
   a mobile chassis frame having an axle connecting a pair of ground engaging wheels, crank means pivotally attached to said chassis frame, a movable frame component pivotally attached to said crank means adjacent one end thereof and being slidably attached to said axle adjacent another end thereof whereby said movable frame component is caused to move in a reciprocatable fashion in a substantially horizontal plane relative to said mobile chassis frame by movement of said crank means; and
   foot means supported by the movable frame component, said foot means being spaced from the drilling members and which foot means contacts the ground surface when the drilling members are in the operative position.

2. Coring apparatus as claimed in claim 1 wherein the chassis frame carries the coring support and is pivotally movable on a horizontal axis from an upper location which corresponds to the inoperative position of the drilling members to a lower location which corresponds to the operative position of the drilling members.

3. Coring apparatus as claimed in claim 1 wherein the chassis frame is rigidly attached to the axle.

4. Coring apparatus as claimed in claim 1 wherein said drilling members are oriented in at least one row.

5. Coring apparatus as claimed in claim 1 wherein said rotational means includes a plurality of sprockets mounted on the coring support wherein each sprocket is co-extensive with a respective drilling member and each sprocket is driven by an endless belt associated with a drive motor on the chassis frame through a belt drive.

6. Coring apparatus as claimed in claim 5 wherein there is also provided a plurality of idlers on the coring support with each idler being engaged by said endless belt.

7. Coring apparatus as claimed in claim 6 wherein the drive motor is coupled by clutch means to the endless belt.

8. Coring apparatus as claimed in claim 5 wherein said crank means includes a pair of crank members on each side of the chassis frame and each crank member is rotationally connected to an output shaft of a reduction gear box which gear box is coupled to a drive axle of the drive motor and is pivotally attached to said movable frame component so that rotation of each crank member causes a walking movement of the foot means from a first ground drilling position to a second ground drilling position.

9. Coring apparatus as claimed in claim 1 wherein the foot means advances the chassis frame along the ground when the drilling members are in the inoperative position.

10. Coring apparatus as claimed in claim 1 wherein there is further provided centering means for causing the coring apparatus to be self propelled so that the coring apparatus may move in circles about the centering means.

11. Coring apparatus as claimed in claim 10 wherein the centering means comprises a centering device fixed to the ground surface and connected to the coring apparatus by a flexible cable wound around the centering device.

12. Coring apparatus as claimed in claim 1 wherein there is further provided height adjustment means so as to control the drilling depth of the drilling members.

13. Coring apparatus as claimed in claim 12 wherein the height adjustment means includes a canopy fixed to the chassis frame and a line member interconnecting the canopy to the coring support.

14. Coring apparatus as claimed in claim 1 wherein said drilling members are oriented in a plurality of rows.

* * * * *